United States Patent
Lo et al.

(10) Patent No.: US 7,210,351 B2
(45) Date of Patent: May 1, 2007

(54) MICRO ACCELEROMETER

(75) Inventors: Yuan Lo, Longtan Township, Taoyuan County (TW); Kye-Chyn Ho, Longtan Township, Taoyuan County (TW); Lung-Yung Lin, Hsinchu (TW); Deng-Horng Tsai, Dayuan Township, Taoyuan County (TW); Schiu Sche, Hsinchu (TW)

(73) Assignees: Chung Shan Institute of Science and Technology, Taoyuan County (TW); Neostones Micro Fabrication Corporation, Hsinchu (TW)

( * ) Notice: Subject to any disclaimer, the term of this patent is extended or adjusted under 35 U.S.C. 154(b) by 59 days.

(21) Appl. No.: 10/974,712

(22) Filed: Oct. 28, 2004

(65) Prior Publication Data

US 2005/0274185 A1    Dec. 15, 2005

(30) Foreign Application Priority Data

Jun. 10, 2004    (TW) ............................... 93116696 A (51) Int. Cl.
*G01P 15/125* (2006.01)

(52) U.S. Cl. ...................................... 73/514.32; 73/510

(58) Field of Classification Search .................. 73/510, 73/514.18, 514.32
See application file for complete search history.

(56) References Cited

U.S. PATENT DOCUMENTS

| 5,487,305 | A | | 1/1996 | Ristic et al. |
|---|---|---|---|---|
| 5,756,901 | A | | 5/1998 | Kurle et al. |
| 5,777,227 | A | | 7/1998 | Cho et al. |
| 5,817,942 | A | | 10/1998 | Greiff |
| 5,900,550 | A | | 5/1999 | Menzel |
| 6,018,998 | A | | 2/2000 | Zunino et al. |
| 6,041,653 | A | * | 3/2000 | Ichikawa et al. ........ 73/514.32 |
| 6,128,956 | A | | 10/2000 | Foote |
| 6,149,190 | A | | 11/2000 | Galvin et al. |
| 6,201,284 | B1 | | 3/2001 | Hirata et al. |
| 6,223,598 | B1 | | 5/2001 | Judy |
| 6,981,416 | B2 | * | 1/2006 | Chen et al. .............. 73/514.32 |

\* cited by examiner

*Primary Examiner*—John E. Chapman
(74) *Attorney, Agent, or Firm*—Rabin & Berdo, P.C.

(57) ABSTRACT

A micro accelerometer including a plurality of proof masses is provided to detect the acceleration of the first axis, the second axis and the third axis. The disclosed micro accelerometer has the advantages of close loop control, mechanical decoupling, and not relying on high aspect ratio manufacturing technology.

36 Claims, 10 Drawing Sheets

MICRO ACCELEROMETER

This Non-provisional application claims priority under 35 U.S.C. § 119(a) on Patent Application No(s). 093116696 filed in Taiwan, R.O.C. on Jun. 10, 2004, the entire contents of which are hereby incorporated by reference.

BACKGROUND OF THE INVENTION

1. Field of Invention

The invention relates to an accelerometer, and, in particular, to an accelerometer that is manufactured by Micro Electro Mechanical System (MEMS) technology and has the capability of sensing one axis, two axes or three axes acceleration.

2. Related Art

U.S. Pat. No. 6,201,284 discloses an accelerometer which adopts proof masses to detect the acceleration of X, Y and Z axes. The proof mass detecting Z axis acceleration only moves along the Z axis, however, the motion of the proof mass detecting X axis may be coupled from the X and Y axes, and the motion of the proof mass detecting Y axis may be coupled from the X, Y and Z axes. The mechanical coupling in this structure is such that the sensing signals of different axes interfere with each other. The performance is thus affected seriously. The performance also relies on the high aspect ratio manufacturing technology. This is because the signals of the X and Y axes are detected by electrodes, which are co-planar with the proof mass. Only high aspect ratio manufacturing technology may satisfy the requirement of high sensitivity and small distance between the proof masses and the electrodes.

Structure improvements and control methods regarding accelerometers are disclosed in U.S. Pat. Nos. 5,756,901, 5,817,942, 5,900,550, 6,223,598, 5,777,227, 6,128,956, 6,149,190, 5,487,305, and 6,018,998.

The acceleration sensing method in the prior art adopts a co-planar electrode structure, as in U.S. Pat. Nos. 5,756,901, 5,817,942, 5,900,550, and 6,223,598. 5,487,305 has the drawbacks of insufficient intensity of signal sensing and complexity of signal processing circuits. Therefore, there is need for a new accelerometer structure.

SUMMARY OF THE INVENTION

The object of the invention is to provide a micro accelerometer to substantially solve the foregoing problems and drawbacks of the related art.

According to the object of the invention, one embodiment of the micro accelerometer for sensing the acceleration of a signal axis comprises a first proof mass, a second proof mass and a third proof mass arranged at each of the two opposite sides of the first proof mass, connected to the first proof mass by two flexible supporters and having a plurality of slots formed thereon, wherein the second proof mass and the third proof mass move along a first axial direction parallel to the first proof mass, and a plurality of electrode plate sets arranged relative to the second proof mass and the third proof mass respectively, for forming a plurality of sensing electrode sets at the first axial direction together with the second proof mass and the third proof mass, wherein the sensing electrodes are configured in differential circuits. Furthermore, the second proof mass and the third proof mass are arranged with a close loop (closed loop) control electrode for controlling the second proof mass and the third proof mass to move back to the original position when the second proof mass and the third proof mass generate displacement caused by acceleration.

According to the object of the invention, another embodiment of the micro accelerometer for sensing the acceleration of X and Z axes or Y and Z axes comprises a first proof mass moving in the axial direction vertical to the first proof mass, a second proof mass and a third proof mass arranged at each of the two opposite sides of the first proof mass, connected to the first proof mass by two flexible supporters and having a plurality of slots formed thereon, wherein the second proof mass and the third proof mass move along a first axial direction parallel to the first proof mass, a lower electrode arranged relative to the first proof mass for forming a sensing capacitor together with the first proof mass, and a plurality of electrode plate sets arranged relative to the second proof mass and the third proof mass respectively, for forming a plurality of sensing electrode sets at the first axial direction together with the second proof mass and the third proof mass, wherein the sensing electrodes are configured in differential circuits. Furthermore, the second proof mass and the third proof mass are arranged with a close loop control electrode for controlling the second proof mass and the third proof mass to move back to the original position when the second proof mass and the third proof mass generate displacement caused by acceleration.

According to the object of the invention, another embodiment of the micro accelerometer for sensing the acceleration of X and Y axes comprises a first proof mass, a second proof mass and a third proof mass arranged at each of the two opposite sides of the first proof mass, connected to the first proof mass by two flexible supporters and having a plurality of slots formed thereon, wherein the second proof mass and the third proof mass move along a first axial direction parallel to the first proof mass, a fourth proof mass and a fifth proof mass arranged at each of the two opposite sides of the first proof mass, connected to the first proof mass by two flexible supporters and having a plurality of slots formed thereon, wherein the fourth proof mass and the fifth proof mass move along a second axial direction parallel to the first proof mass, a plurality of electrode plate sets arranged relative to the second proof mass, the third proof mass, the fourth proof mass and the fifth proof mass respectively, for forming a plurality of sensing electrode sets at the first axial direction together with the second proof mass and the third proof mass and forming a plurality of sensing electrode sets at the second axial direction together with the fourth proof mass and the fifth proof mass, wherein the sensing electrodes are configured in differential circuits. Furthermore, the second proof mass and the third proof mass are arranged with a close loop control electrode, for controlling the second proof mass and the third proof mass to move back to the original position when the second proof mass and the third proof mass generate displacement caused by an acceleration. The fourth proof mass and the fifth proof mass are arranged with a close loop control electrode, for controlling the fourth proof mass and the fifth proof mass to move back to the original position when the fourth proof mass and the fifth proof mass generate displacement caused by an acceleration.

According to the object of the invention, another embodiment of the micro accelerometer for sensing the acceleration of X, Y and Z axes comprises a first proof mass moving in the axial direction vertical to the first proof mass, a second proof mass and a third proof mass arranged at each of the two opposite sides of the first proof mass, connected to the first proof mass by two flexible supporters and having a plurality of slots formed thereon, wherein the second proof mass and the third proof mass move along a first axial direction parallel to the first proof mass, a fourth proof mass and a fifth proof mass arranged at each of the two opposite sides of the first proof mass, connected to the first proof mass by two flexible supporters and having a plurality of slots formed thereon, wherein the fourth proof mass and the fifth proof mass move along a second axial direction parallel to the first proof mass, a lower electrode arranged relative to the first proof mass for forming a sensing capacitor together with the first proof mass, and a plurality of electrode plate sets arranged relative to the second proof mass, the third proof mass, the fourth proof mass and the fifth proof mass respectively, for forming a plurality of sensing electrode sets at the first axial direction together with the second proof mass and the third proof mass and forming a plurality of sensing electrode sets at the second axial direction together with the fourth proof mass and the fifth proof mass, wherein the sensing electrodes are configured in differential circuits. Furthermore, the second proof mass and the third proof mass are arranged with a close loop control electrode, for controlling the second proof mass and the third proof mass to move back to the original position when the second proof mass and the third proof mass generate displacement caused by an acceleration. The fourth proof mass and the fifth proof mass are arranged with a close loop control electrode, for controlling the fourth proof mass and the fifth proof mass to move back to the original position when the fourth proof mass and the fifth proof mass generate displacement caused by an acceleration.

According to the object of the invention, another embodiment of the micro accelerometer for sensing the acceleration of X or Y axes comprises a base, a proof mass arranged on the base and having a plurality of slots formed thereon, and moving in the axial direction parallel to the base, and a plurality of electrode plate sets arranged relative to the proof mass for forming a plurality of sensing electrode sets at the axial direction, wherein the sensing electrodes are configured in differential circuits. Furthermore, the proof mass is arranged with two close loop control electrodes positioned at the two sides of the proof mass, for controlling the proof mass to move back to the original position when the proof mass generates displacement caused by acceleration.

According to the object of the invention, another embodiment of the micro accelerometer for sensing the acceleration of X, Y, and Z axes comprises a base, a first proof mass arranged on the base and having a plurality of holes formed thereon, and moving in the axial direction vertical to the base, a second proof mass arranged on the base and having a plurality of slots formed thereon, and moving in a first axial direction parallel to the base, a third proof mass arranged on the base and having a plurality of slots formed thereon, and moving in a second axial direction parallel to the base, a lower electrode plate arranged relative to the first proof mass for forming a sensing capacitor together with the first proof mass, and a plurality of electrode plate sets arranged relative to the second proof mass and the third proof mass, for forming a plurality of sensing electrode sets at the first axial direction together with the second proof mass, and forming a plurality of sensing electrode sets at the second axial direction together with the third proof mass, wherein the sensing electrodes are configured in differential circuits. Furthermore, the second proof mass and the third proof mass are arranged with two close loop control electrodes positioned at the two sides of the related proof mass, for controlling the second proof mass and the third proof mass to move back to the original position when the second proof mass and the third proof mass generate displacement caused by an acceleration.

According to the principle and object of the invention, the plurality of electrode plate sets are arranged relative to the proof mass for forming a plurality of sensing electrode sets. The sensing electrodes are configured in differential circuits to increase the sensing capacitance.

According to the principle and object of the invention, the disclosed micro accelerometer has the advantage of mechanically decoupling. The motion of the X and Y axes is in a decoupling direction, such that the signals do not interfere with each other. However, the sensing proof mass of Z axis detects three-axis motion, but only the areas of the sensing electrodes may be covered by the Z axial proof mass, the sensing signals of Z axis are not affected by the motion of X axis and Y axis.

According to the principle and object of the invention, the disclosed micro accelerometer has the advantage of not being affected by the high aspect ratio manufacturing technology. The sensing electrodes of the three axes are arranged under the proof mass. The sensing electrodes of the X and Y axes detect the overlapped area variation between the proof mass and the electrodes. The sensing electrodes of the Z axis detect the distance variation between the proof mass and the electrode. Therefore, performance is not affected by the high aspect ratio manufacturing technology.

According to the principle and object of the invention, the disclosed micro accelerometer has the advantage of close loop control to increase the precision and bandwidth effectively.

It is to be understood that both the foregoing general description and the following detailed description are exemplary and are intended to provide explanation of the invention as claimed.

BRIEF DESCRIPTION OF THE DRAWINGS

The accompanying drawings, which are included to provide a further understanding of the invention and constitute a part of this specification, illustrate embodiments of the invention and together with the description serve to explain the principles of the invention. In the drawings.

DETAILED DESCRIPTION OF THE INVENTION

Reference will now be made in detail to the embodiments of the invention, examples of which are illustrated in the accompanying drawings.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1A:
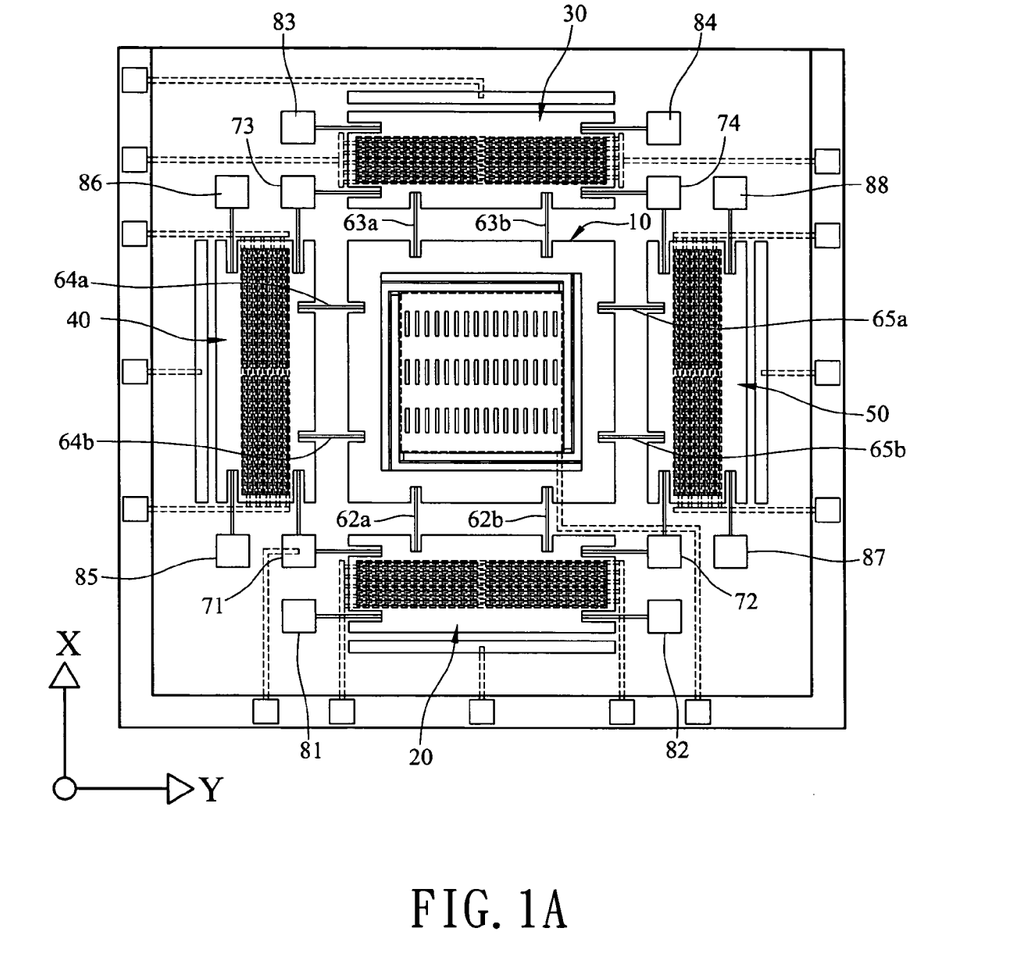
FIG. 1A is a schematic diagram of the first embodiment of the micro accelerometer in accordance with the invention.
Figure 1B:
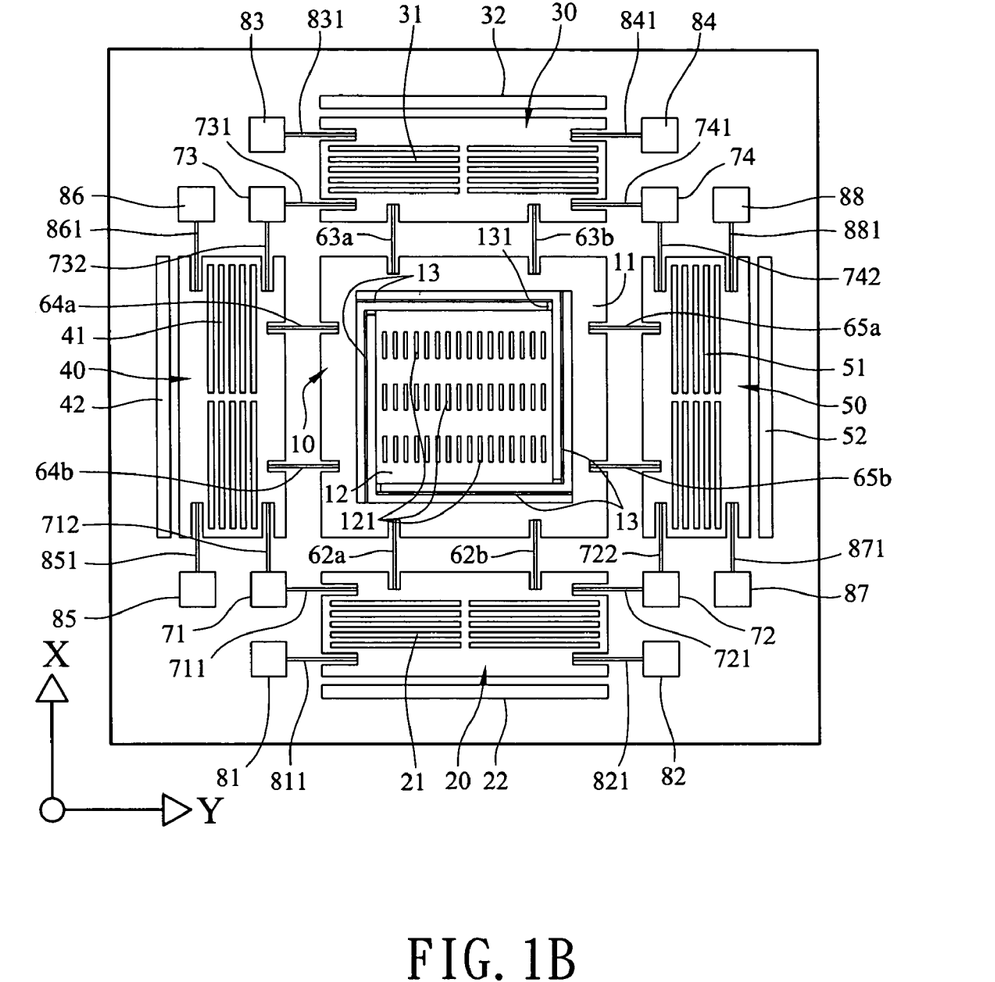
FIG. 1B is a schematic diagram of the first embodiment of the micro accelerometer in accordance with the invention.
Figure 1C:
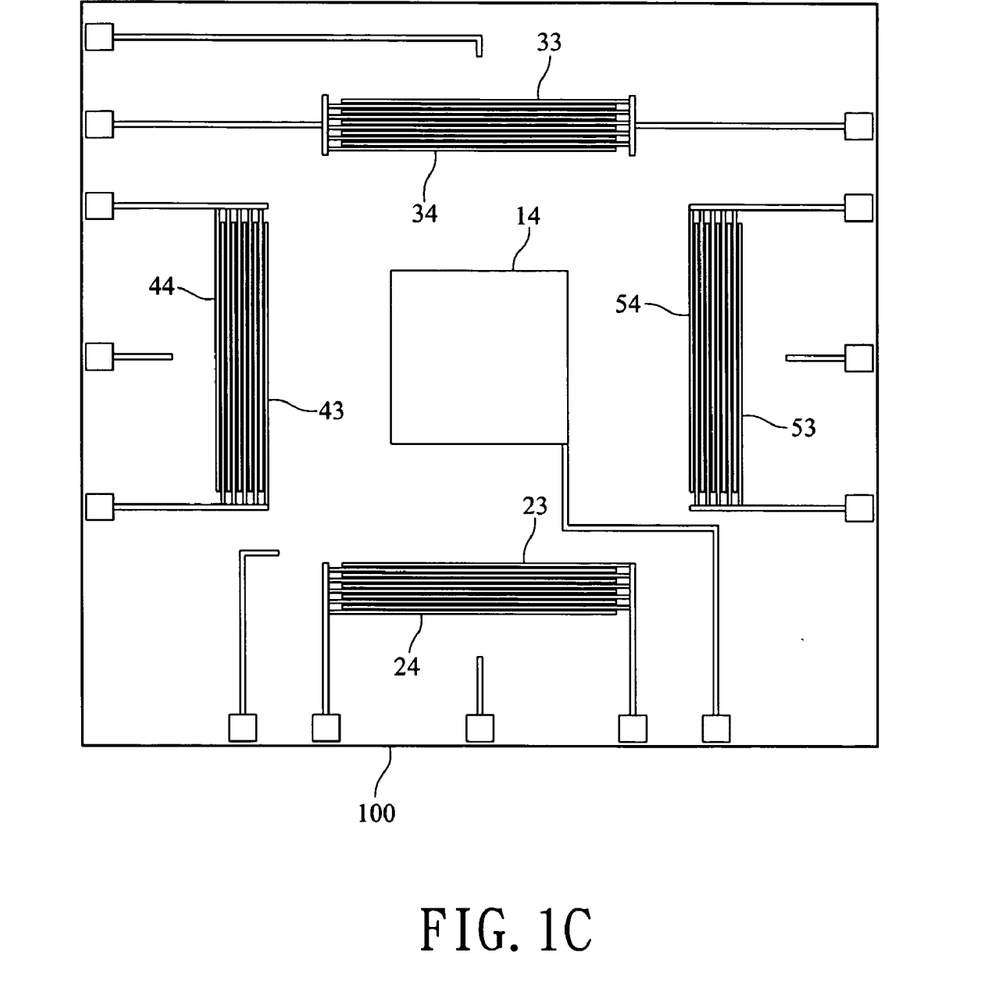
FIG. 1C is a schematic diagram of the first embodiment of the micro accelerometer in accordance with the invention.
Figure 1D:
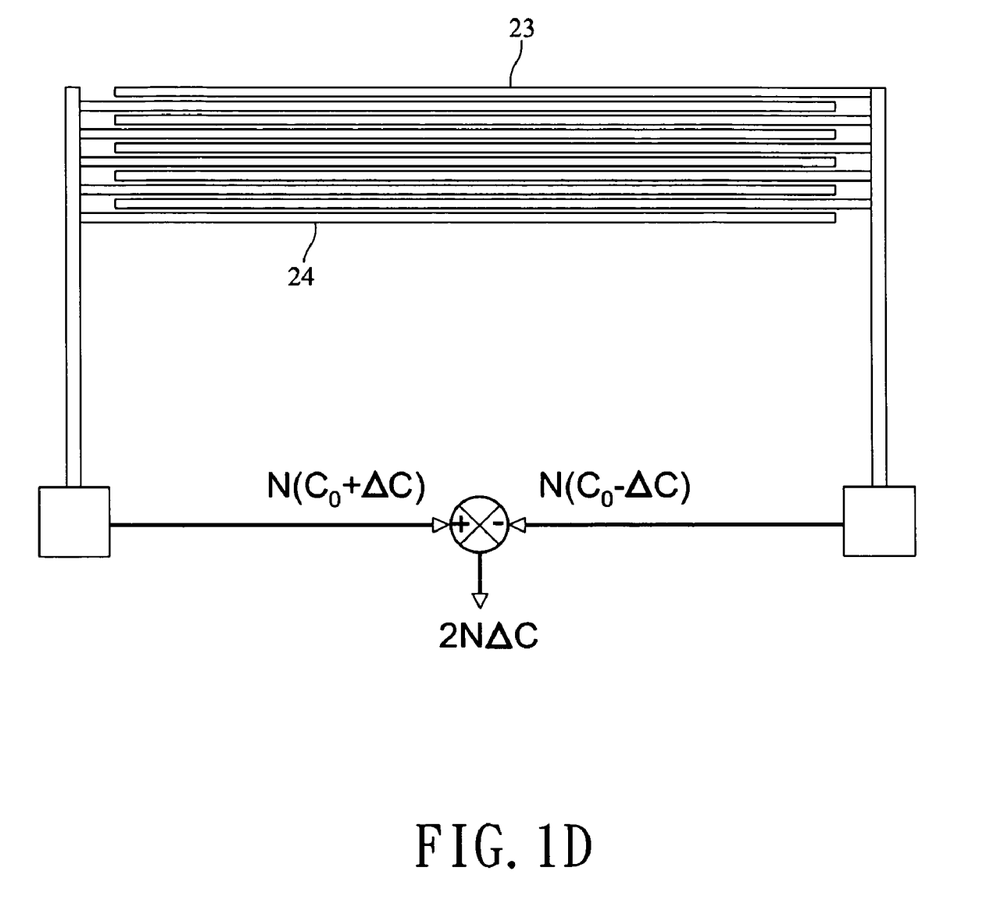
FIG. 1D depicts the differential sensing circuit of the first embodiment of the micro accelerometer in accordance with the invention.

Refer to FIGS. 1A to 1C depicting schematic diagrams of the first embodiment of the micro accelerometer, and FIG. 1D depicting the differential sensing circuit of the first embodiment.

In the first embodiment, the micro accelerometer is composed of a first proof mass 10, a second proof mass 20, a third proof mass 30, a fourth proof mass 40, and a fifth proof mass 50. The proof masses are manufactured by conductive material. The second proof mass 20 and the third proof mass 30 are arranged at one of the two opposite sides of the first proof mass 10, while the third proof mass 40 and the fifth proof mass 50 are arranged at the other one of the two opposite sides of the first proof mass 10. The proof mass 20, 30, 40, and 50 are connected to the first proof mass 10 through a plurality pairs of flexible supporters 62a, 62b, 63a, 63b, 64a, 64b 65a, and 65b respectively.

The plurality of flexible supporters 62a, 62b, 63a, 63b, 64a, 64b 65a, and 65b enable the proof masses to move along a first axis (e.g., the x axis), a second axis (e.g., the y axis) parallel to the surface of the first proof mass 10, and/or a third axis (e.g., the z axis) vertical to the surface of the first proof mass 10. The inertia mass body composed of the first proof mass 10, the second proof mass 20, and the third proof mass 30 moves along the first axis parallel to the first proof mass 10, while the inertia mass body composed of the first proof mass 10, the fourth proof mass 40, and the fifth proof mass 50 moves along the second axis parallel to the first proof mass 10.

According to the principle of the invention, the aforementioned five proof masses form a three-axial accelerometer or a two-axial accelerometer. Furthermore, combination of any of the proof masses may compose accelerometers with desired axes. In one embodiment, for example, a one-axial or a two-axial accelerometer may be provided by combining the first proof mass 10, the second proof mass 20 and the third proof mass 30, or the first proof mass 40, the fourth proof mass 10 and the fifth proof mass 50.

The first proof mass 10 includes a frame 11 and an upper electrode plate 12, which are connected together by a plurality of flexible supporters 13 arranged at the sides of the upper electrode plate 12. Each of the flexible supporters 13 has a connecting portion to connect the flexible supporters 13 and the upper electrode plate 12. A plurality of holes is formed on the upper electrode plate 12. Besides the shape and the quantity as shown in the figure, any variation or design may be performed. The main propose of the holes is to reduce damping occurring when the electrode plate 12 moves along the third axis.

The proof mass 10 and the lower electrode plate 14 arranged under the base 100 form a sensing capacitor for the third axis. When the third-axial displacement of the proof mass 10 occurs due to the third-axial acceleration, the capacitance of the third-axial sensing capacitor varies with the distance change between the upper electrode plate 12 and the lower electrode plate 14. Therefore, the third axial acceleration is detected through the capacitance variation. In one embodiment, a capacitor may be further provided in the close loop (closed loop) circuits as a reference capacitor for the acceleration sensing signal. The capacitance is the same as the initial value formed by the upper electrode plate 12 and the lower electrode plate 14. Thus, close loop control is performed such that the first proof mass 10 may return back to its original position.

The second proof mass 20 is connected to the frame 11 through a pair of flexible supporters 62a and 62b, and is fixed on the supporting anchors 71, 72, 81, and 82 through the flexible supporters 711, 721, 811 and 821. The third proof mass 30 is connected to the frame 11 through a pair of flexible supporters 63a and 63b, and is fixed on the supporting anchors 73, 74, 83, and 84 through the flexible supporters 731, 741, 831 and 841. The fourth proof mass 40 is connected to the frame 11 through a pair of flexible supporters 64a and 64b, and fixed on the supporting anchors 71, 73, 85, and 86 through the flexible supporters 712, 732, 851 and 861. The fifth proof mass 50 is connected to the frame 11 through a pair of flexible supporters 65a and 65b, and fixed on the supporting anchors 72, 74, 87, and 88 through the flexible supporters 722, 742, 871 and 881.

Through the aforementioned supporting structure, the second proof mass 20 and the third proof mass 30 are restricted to only move along the first axis, while the fourth proof mass 40 and the fifth proof mass 50 are restricted to only move along the second axis. It is clear from the structure of the invention that the motion of the two axes do not interfere with each other. Thus, mechanical decoupling of the two axes is achieved in accordance with the object of the invention, and cross-axis sensitivity may be reduced effectively.

A plurality of slots 21 is formed on the proof mass 20. Similarly, a plurality of slots 31, 41, and 51 are formed on the relative proof masses 40, 40, and 50 respectively. Each of the slots is arranged with electrodes for forming a plurality of sensing electrodes, which are configured in differential circuits. Detailed description is given as follows.

Refer to FIGS. 1C and 1D. A plurality of rectangular electrode plates 23 and 24 interleaving with each other are arranged under the slots 21 of the proof mass. Each of the slots 21 covers a portion of the electrodes 23 and 24 for forming the sensing capacitors. Let the initial value of the capacitor be $C_0$. When the proof mass 20 generates displacement along the first axis owing to the acceleration of the first axis, the effective area covered by the hole 21 and the electrode plates 23 and 24 changes accordingly, the capacitance of which becomes $C_0-\Delta C$ and $C_0+\Delta C$, respectively. In one embodiment, in which N slots 21 and N electrode plates 23 and 24 are arranged relative to one another, the capacitance becomes $N(C_0-\Delta C)$ and $N(C_0+\Delta C)$ respectively. The total capacitance variance becomes $2N\Delta C$ after being detected by differential circuits. Thus, the acceleration of the first axis is obtained through detecting the capacitance variation.

According to the principle of the invention, the third proof mass 30 has slots 31 and relative to electrode plates 33 and 34 for forming a plurality of sensing electrodes, which are configured in differential circuits. When the first axial displacement of the third proof mass 30 caused by the first-axial acceleration occurs, the capacitance value changes with the variation of the effective areas covered by the slots 31. Thus, the first axial acceleration is obtained by sensing the capacitance variation. It is clear that the arrangement of the two sets of proof masses increases not only the inertia mass of inertia motion, but also the intensity of the sensing signals through.

According to the principle of the invention, the fourth proof mass 40 and the fifth proof mass 50 are arranged with slots 41 and slots 51 respectively, and relative to electrode plates 43, 44, 53, and 54 for forming a plurality of sensing electrodes, which are configured in differential circuits. When the fourth proof mass 40 and the fifth proof mass 50 generate the second axial displacement caused by the second-axial acceleration, the capacitance changes with the variation of the effective areas covered by the slots 41 and 51. Thus, the second-axial acceleration is obtained by sensing the capacitance variation.

A close loop control electrode 22, which may be a rectangular electrode in one embodiment, is provided at one side of the second proof mass 20. The first axial acceleration detected through the variation of the capacitance is fed back to the close loop control electrode 22 through feedback circuits (not shown) such that the second proof mass 20 may return to its original central position. According to the principle of the invention, the close loop control electrodes 32, 42, and 52, arranged relative to one side of the other proof masses, function the same as the close loop control electrode 22.

The three-axis accelerometer of the first embodiment of the invention includes three accelerometers independent from one another, each of which detects acceleration of a single axis without the influence of the other two accelerometers. Deletion of unnecessary accelerometer/s and maintaining accelerometer/s of the desired axis may be performed for sensing one-axis or two-axis acceleration.

Figure 2:
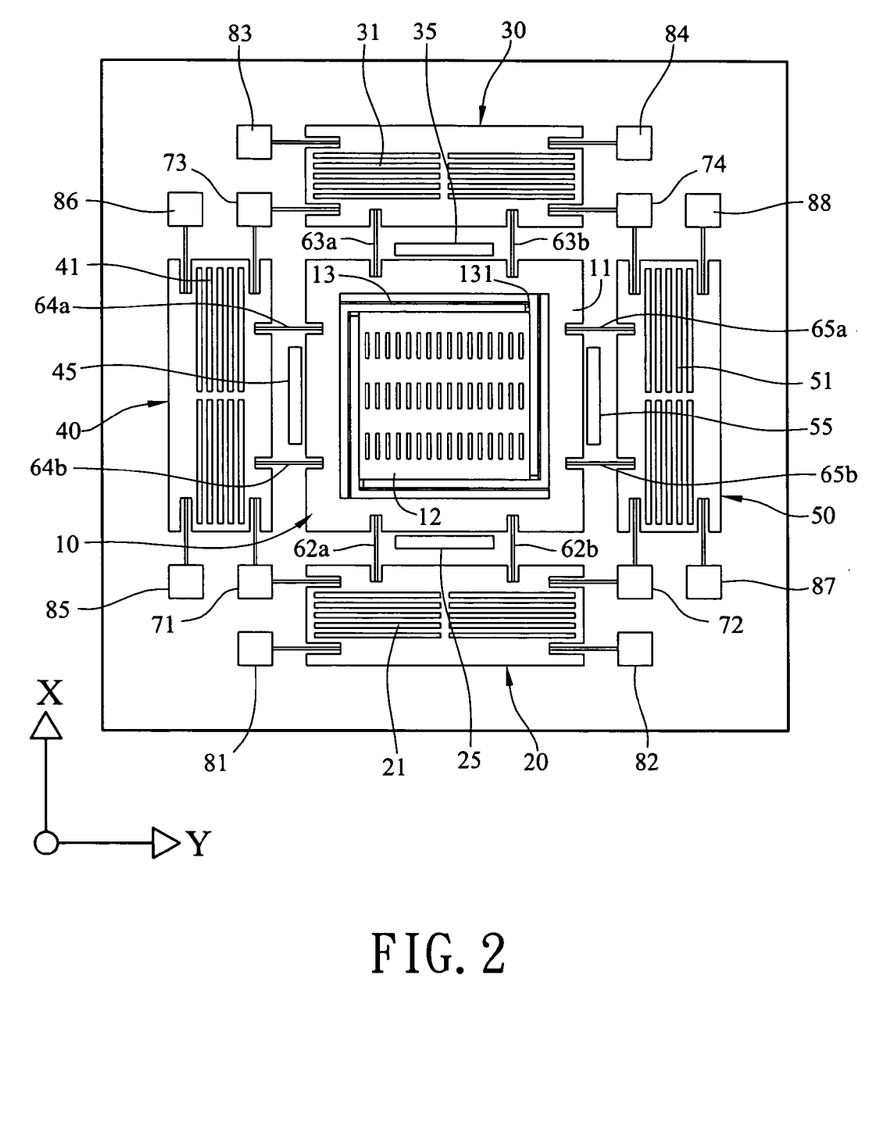
FIG. 2 is a schematic diagram of the second embodiment of the micro accelerometer in accordance with the invention.

Refer to FIG. 2, which depicts a schematic diagram of the second embodiment of the micro accelerometer in accordance with the invention. In the second embodiment, the close loop control electrodes are not the same as those in the first embodiment, while the other structures and functions are similar to those in the first embodiment.

According to the principle of the invention, in the second embodiment, the close loop control electrode of the second proof mass 20 is an electrode plate 25 arranged at the exterior of the frame 11 and between the flexible supporters 62a and 62b. Thus, the proof mass 20 may return to the original position when displacement occurs owing to acceleration. Similarly, the close loop control electrode of the third proof mass 30 is an electrode plate 35 arranged at the exterior of the frame 11 and between the flexible supporters 63a and 63b. The close loop control electrode of the fourth proof mass 40 is an electrode plate 45 arranged at the exterior of the frame 11 and between the flexible supporters 64a and 64b. The close loop control electrode of the third proof mass 50 is an electrode plate 55 arranged at the exterior of the frame 11 and between the flexible supporters 65a and 65b. Thus, the proof masses 30, 40, and 50 may return to their original positions when displacement occurs owing to acceleration.

Figure 3:
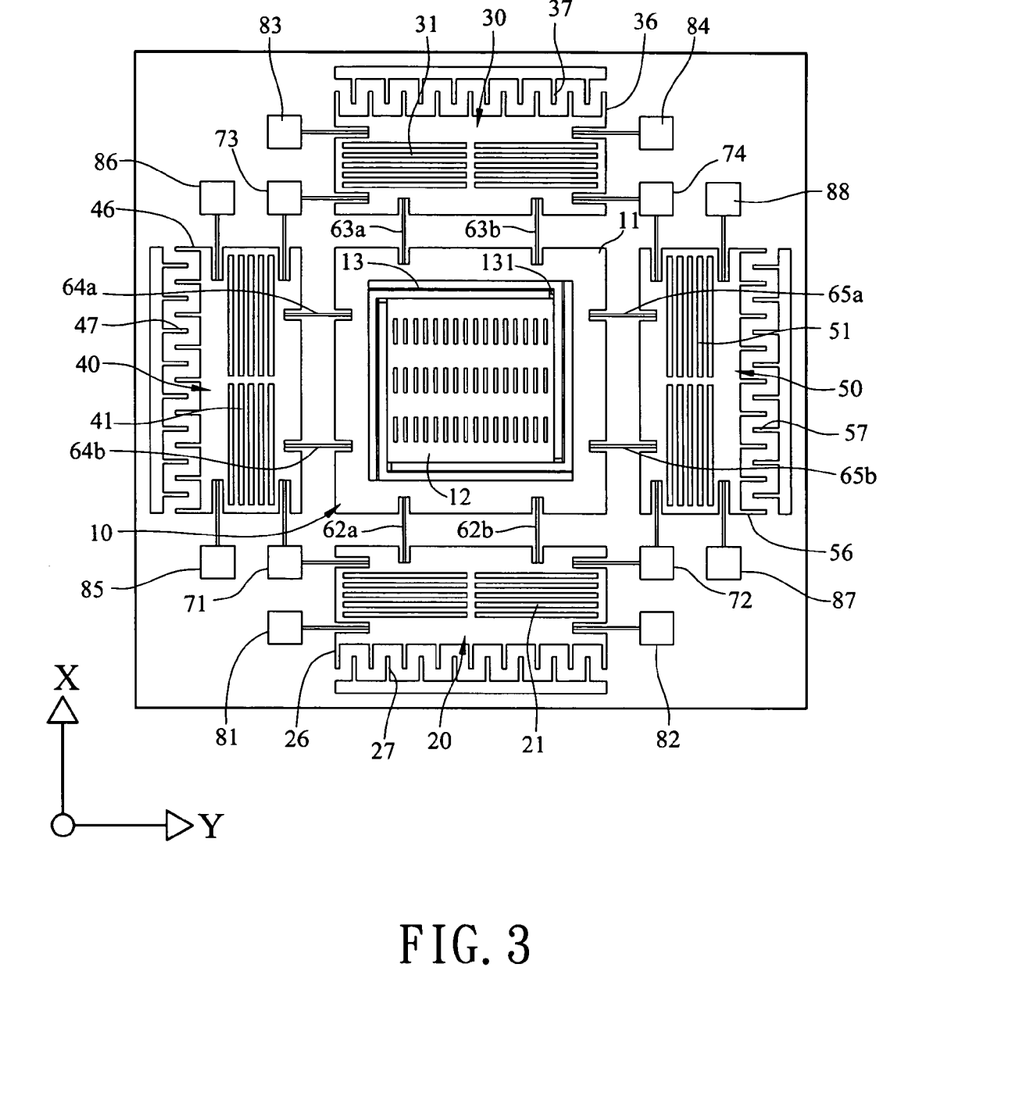
FIG. 3 is a schematic diagram of the third embodiment of the micro accelerometer in accordance with the invention.

Refer to the FIG. 3, which depicts a schematic diagram of the third embodiment of the micro accelerometer in accordance with the invention. The close loop control electrodes are distinctive to this embodiment, while the other structures and functions are similar to those in the first embodiment.

According to the principle of the invention, in the third embodiment, the close loop control electrode of the second proof mass 20 includes a first comb-like electrode 26 and a second comb-like electrode 27. The first comb-like electrode 26 is connected to the second proof mass 20. The comb fingers of the first comb-like electrode 26 and the second comb-like electrode 27 are arranged to interleave with each other. Thus, the proof mass 20 may return to its original position when displacement occurs owing to acceleration. The close loop control electrode of the third proof mass 30 includes a first comb-like electrode 36 and a second comb-like electrode 37. The close loop control electrode of the fourth proof mass 40 includes a first comb-like electrode 46 and a second comb-like electrode 47, while the close loop control electrode of the fifth proof mass 50 includes a first comb-like electrode 56 and a second comb-like electrode 57. The structures and functions of the comb-like electrodes are the same as those of the second proof mass 20.

Figure 4A:
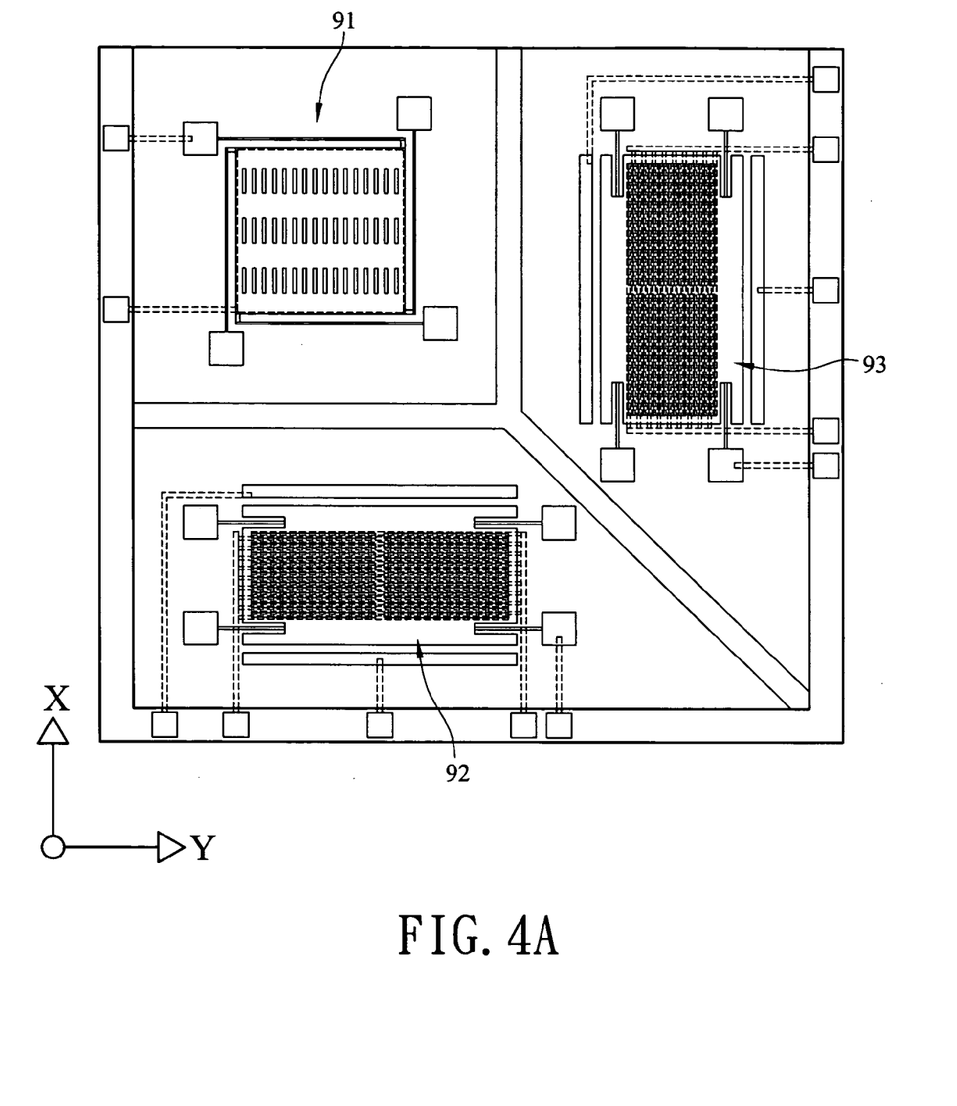
FIG. 4A is a schematic diagram of the fourth embodiment of the micro accelerometer in accordance with the invention.
Figure 4B:
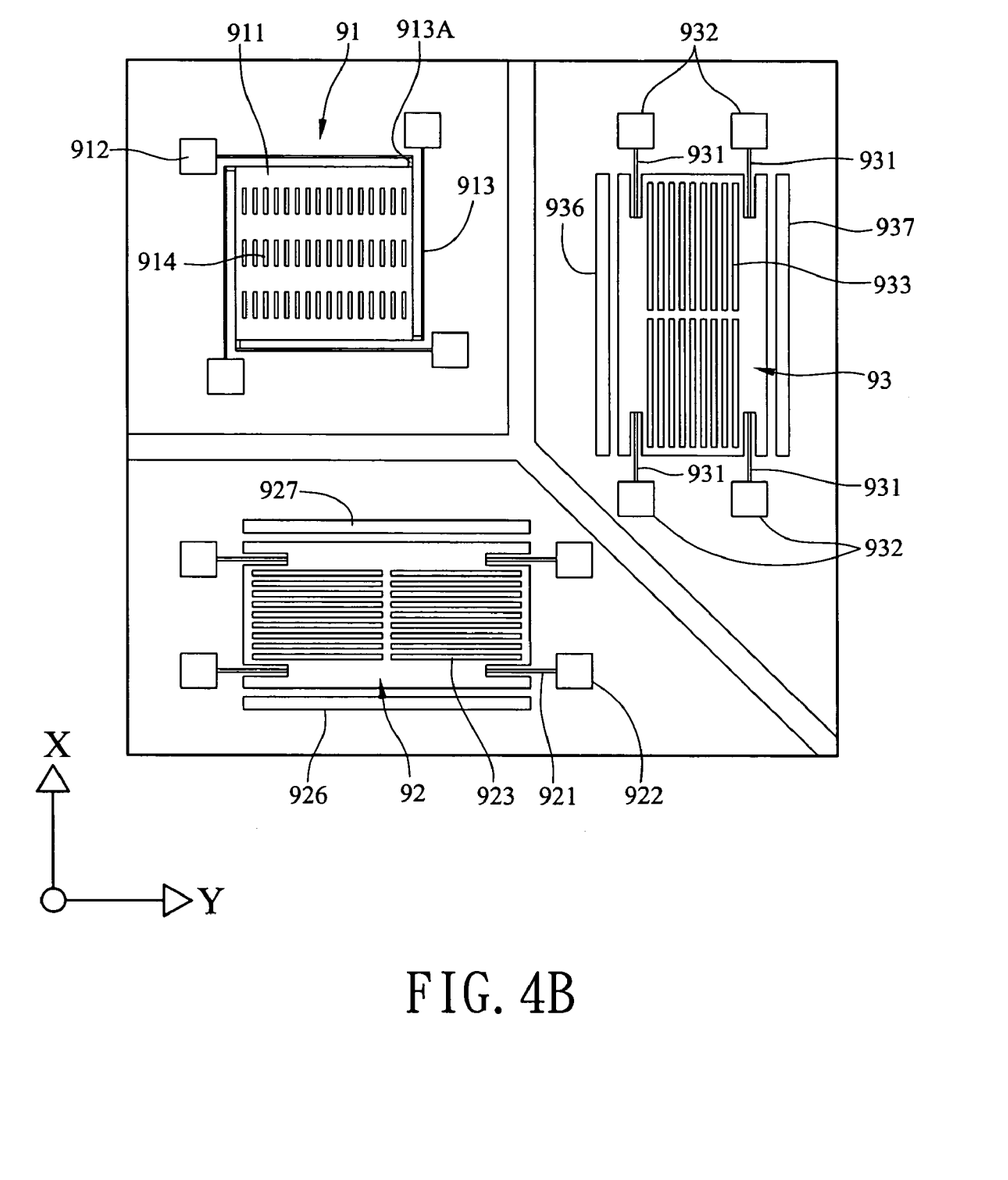
FIG. 4B is a schematic diagram of the fourth embodiment of the micro accelerometer in accordance with the invention.
Figure 4C:
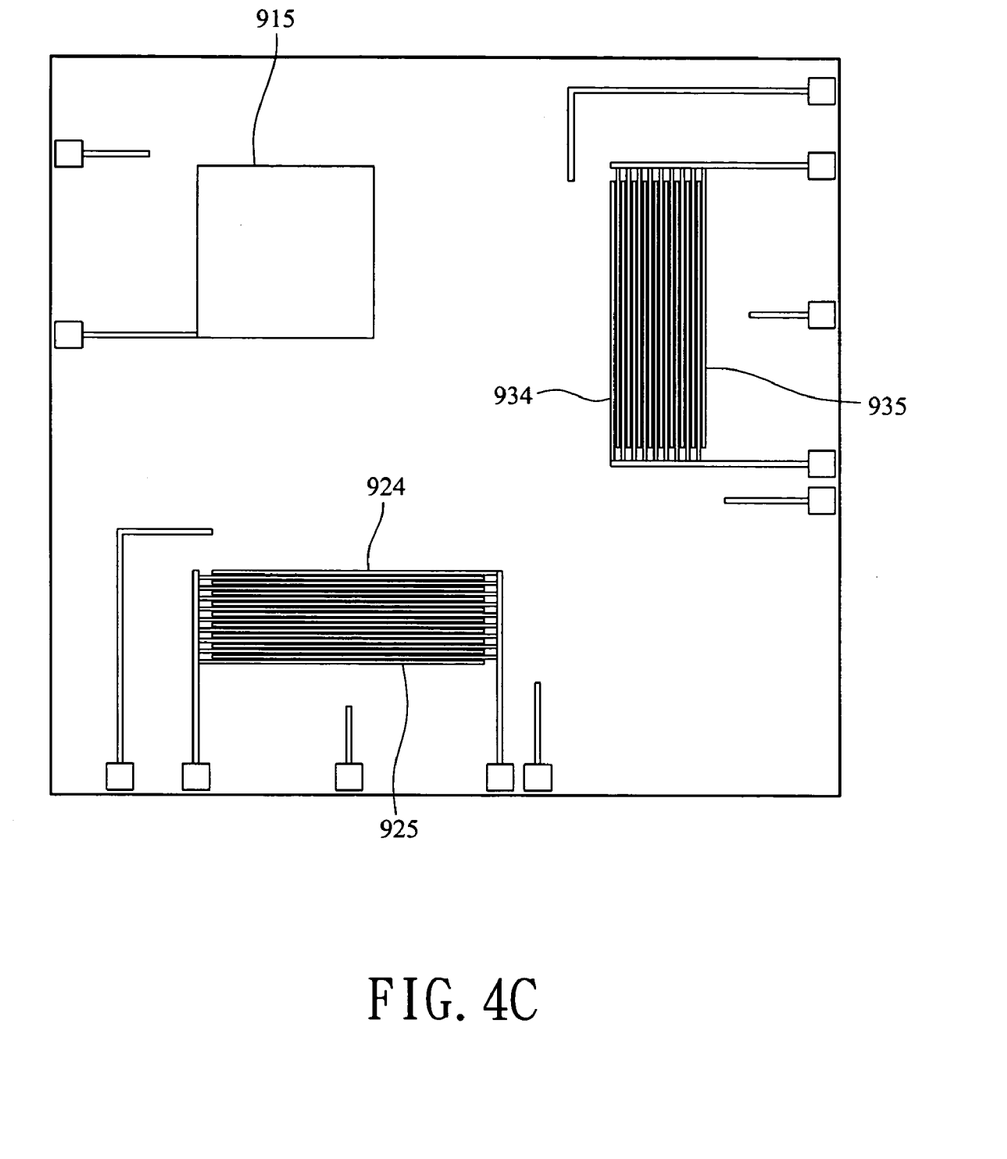
FIG. 4C is a schematic diagram of the fourth embodiment of the micro accelerometer in accordance with the invention.

Refer to FIG. 4, which depicts the fourth embodiment of the accelerometer. In the fourth embodiment, the accelerometers of the first axis, the second axis and the third axis are arranged respectively, and their shape, structure and function are similar to the aforementioned embodiments, but not the same.

The accelerometer in the fourth embodiment has a first proof mass 91 sensing the third axial acceleration vertical to a base, a second proof mass 92 sensing the first axial acceleration parallel to the base and a third mass 93 sensing the second axial acceleration parallel to the base. The acceleration sensors of the three axes are formed on the base. The first proof mass 91 is supported on four supporting anchors 912 through four flexible supporters 913, while the second proof mass 92 is supported on four supporting anchors 922 through four flexible supporters 921. The third proof mass 93 is supported on four supporting anchors 932 through four flexible supporters 931.

Refer to FIG. 4B. A plurality of slots 923 is formed on the second proof mass 92, while a plurality of slots 933 is formed on the third proof mass 93. Electrode plates are placed under each slot for forming a plurality of sensing electrodes, which are configured in differential circuits. Detailed description is given as follows.

Refer to FIG. 4C. A plurality of rectangular electrode plates 924, 925, 934, and 935 are interleaved with each other and arranged under each hole. Each slots 923 and 933 covers a portion of the electrode plates 924, 925, 934, and 935 for forming a plurality of sensing electrodes, which are configured in differential circuits. Thus, when the second proof mass 92 generates displacement of the first axis caused by the first-axial acceleration, the capacitance changes with the variation of the effective areas covered by the slots 923. The second axial acceleration is obtained in similar way.

The acceleration sensor of the third axis, which is the vertical axis, includes an upper electrode plate 911 and a lower electrode plate 915. The upper electrode plate 911 is connected through a plurality of flexible supporters 913 arranged at the four sides of the upper electrode plate 911. The flexible supporter 913 has a connecting portion 913A for forming the flexible supporters 913 and the electrode plate 911. A plurality of holes 914 is formed on the upper electrode plate 911. Besides the shape and the quantity as shown in the figure, any variation or design may be performed. The main propose of the holes is to reduce damping occurring when the upper electrode plate 913 moves along the third axis.

The upper electrode plate 911 and the lower electrode plate 915 form the sensing capacitor of the third axis. When the first proof mass 91 generates displacement along the third axis owing to the third axial acceleration, the capacitance of the sensing capacitor of the third axis varies with the distance change between the upper electrode plate 911 and the lower electrode plate 915. Thus, the third axial acceleration is obtained by detecting the capacitance variation. In one embodiment, a capacitor may be further provided in the close loop circuits as a reference capacitor for the acceleration sensing signal. The capacitance is the same as the initial value formed by the upper electrode plate 911 and the lower electrode plate 915. Thus, close loop control is performed such that the first proof mass 91 may return back to its original position.

The close loop control electrode of the second proof mass 92 has two electrode plates 926 and 927, which are arranged at the two sides of the second proof mass 93 such that the proof mass 92 may return back to its original position when displacement occurs due to acceleration. The close loop control electrode of the third proof mass 93 has two electrode plates 936 and 937, which are arranged at the two sides of the third proof mass 93 such that the proof mass 93 may return back to its original position when displacement occurs due to acceleration. Various changes or modifications of the close loop control electrodes formed by the electrode plates are possible as the second and/or the third embodiment.

Figure 5:
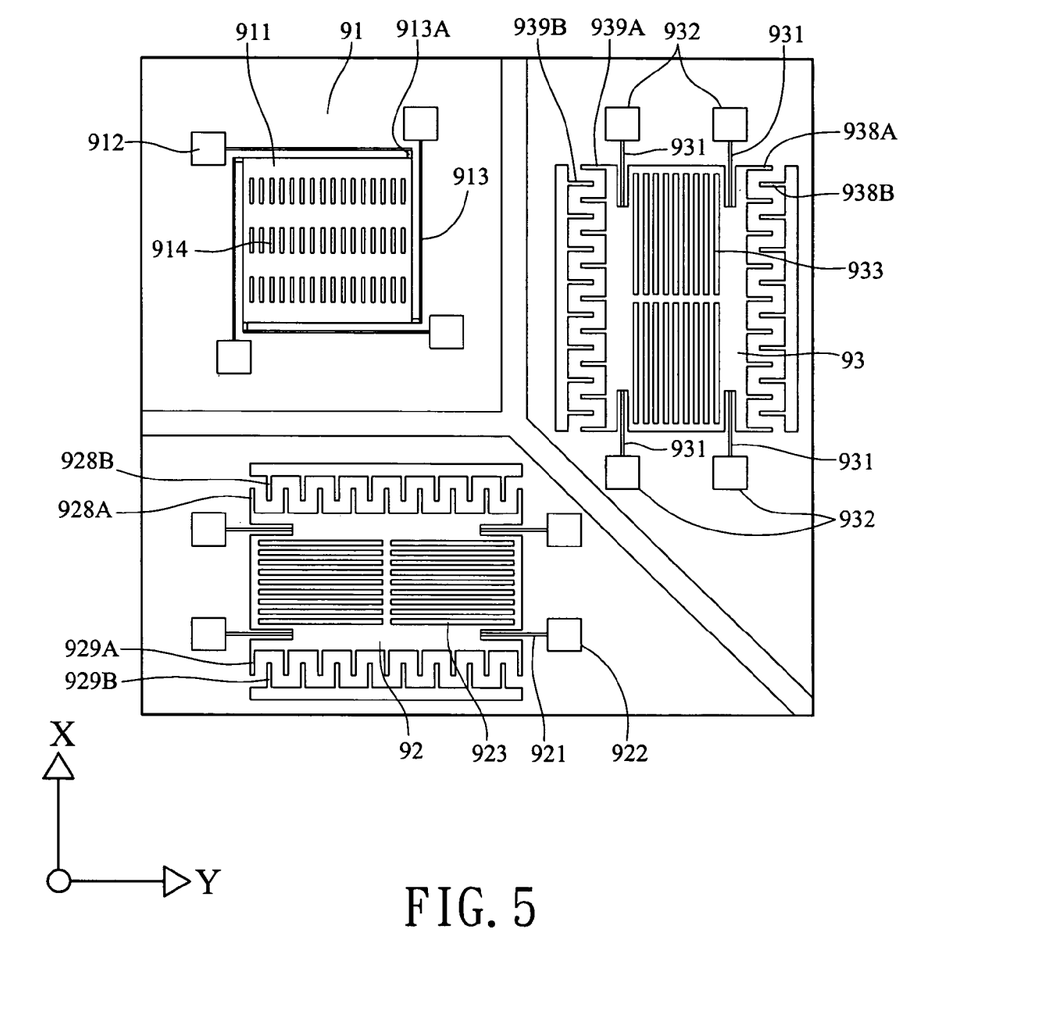
FIG. 5 is a schematic diagram of the fifth embodiment of the micro accelerometer in accordance with the invention.

Refer to the FIG. 5, which depicts a schematic diagram of the fifth embodiment of the micro accelerometer in accordance with the invention. In the fifth embodiment, the close loop control electrodes are not the same as those in the fourth embodiment, while the other structures and functions are similar to those in the fourth embodiment.

The second proof mass 92 is provided with two close loop control electrodes, each of which includes first comb-like electrodes 928A and 929A and second comb-like electrodes 928B and 929B. The first comb-like electrodes 928A and 929A are connected to the second proof mass 92. The comb-like electrodes 928B and 929B are arranged to interleave with each other. Thus, the proof mass 92 may return to its original position when displacement occurs owing to the acceleration.

Similarly, the third proof mass 93 is provided with two close loop control electrodes, each of which includes first comb-like electrodes 938A and 939A and second comb-like electrodes 938B and 939B. The first comb-like electrodes 938A and 939A are connected to the third second proof mass 93. The comb-like electrodes 938B and 939B are arranged to interleave with each other. Thus, the proof mass 93 may return to its original position when displacement occurs owing to acceleration.

The three-axis accelerometer of the fourth and fifth embodiments includes three accelerometers independent from one another, each of which detects acceleration of a single axis without the influence of the other two accelerometers. Deletion of unnecessary accelerometer/s and maintaining accelerometer/s of desired axes may be performed for sensing one-axis or two-axis acceleration.

According to the object and the principle of the invention, the plurality of electrode plates arranged relative to the proof mass for forming a plurality of sensing electrodes, which are configured in differential circuits, may increase the sensing capacitance effectively.

According to the object and the principle of the invention, the motion of the proof mass of the X and Y-axes is in a decoupling direction such that the sensing signals do not interfere with each other. Although the proof mass of the Z axis includes three-axes motion, only the areas of the sensing electrodes may be covered by the Z axis proof mass at any time, thus the sensing signals are not affected by the X and Y axes.

According to the object and the principle of the invention, the sensing electrodes of the three axes are arranged under the relative proof masses. The sensing electrodes of the X and Y axes detect the covered area variation of the proof mass and the relative electrodes, while the sensing electrodes of the Z axis detect the distance variation of the proof mass and the relative electrodes.

Although the invention has been explained by the embodiments shown in the drawings described above, it should be understood to the person skilled in the art that the invention is not limited to these embodiments, but rather various changes or modifications thereof are possible without departing from the spirit and scope of the invention. Accordingly, the scope of the invention shall be determined only by the appended claims and their equivalents.

What is claimed is:

1. A micro accelerometer comprising:
   a first proof mass;
   a second proof mass and a third proof mass arranged at each of the two opposite sides of the first proof mass connected to the first proof mass by two flexible supporters and having a plurality of slots formed thereon, wherein the second proof mass and the third proof mass move along a first axial direction parallel to the first proof mass; and
   a plurality of electrode plate sets arranged relative to the second proof mass and the third proof mass respectively, for forming a plurality of sets of sensing electrodes of the first axial direction together with the second proof mass and the third proof mass, wherein the sensing electrodes are configured in differential circuits.

2. The micro accelerometer of claim 1, wherein the first proof mass comprises:
   a frame;
   an upper electrode plate; and
   a plurality of flexible supporters connecting the frame and the upper electrode plate.

3. The micro accelerometer of claim 2, wherein the upper electrode plate further comprises a plurality of holes formed thereon.

4. The micro accelerometer of claim 1, wherein each set of electrode plates further comprises two sets of electrode plates interleaved with each other and parallel to the slots such that each of the slots covers portion of the electrode plates, where the two sets of electrode plates are configured in differential circuits.

5. The micro accelerometer of claim 1, wherein the proof masses are supported by a plurality of supporting anchors, where the supporting anchors is connected to each of the proof mass though a flexible supporter.

6. The micro accelerometer of claim 1, wherein the second proof mass and the third proof mass are arranged with a close loop control electrode respectively for controlling second proof mass and the third proof mass to move back to the original position when the second proof mass and the third proof mass generate displacement caused by an acceleration.

7. The micro accelerometer of claim 6, wherein the control electrode is rectangular electrode plate, which is arranged at the exterior side of the second proof mass and the third proof mass respectively.

8. The micro accelerometer of claim 6, wherein the control electrode comprises a electrode arranged between the two flexible supporters of the first proof mass.

9. The micro accelerometer of claim 6, wherein the control electrode comprises:
   a first comb-like electrode, connected to the respective proof mass; and
   a second comb-like electrode arranged to interleave with the first comb-like electrode.

10. A micro accelerometer comprising:
a first proof mass moving in the axial direction vertical to the first proof mass;
a second proof mass and a third proof mass arranged at each of the two opposite sides of the first proof mass, connected to the first proof mass by two flexible supporters and having a plurality of slots formed thereon, wherein the second proof mass and the third proof mass move along a first axial direction parallel to the first proof mass;
a lower electrode arranged relative to the first proof mass for forming a sensing capacitor together with the first proof mass; and
a plurality of electrode plate sets arranged relative to the second proof mass and the third proof mass respectively, for forming a plurality of sets of sensing electrodes of the first axial direction together with the second proof mass and the third proof mass, wherein the sensing electrodes are configured in differential circuits.

11. The micro accelerometer of claim 10, wherein the first proof mass comprises:
a frame;
an upper electrode plate; and
a plurality of flexible supporters connecting the frame and the upper electrode plate.

12. The micro accelerometer of claim 11, wherein the upper electrode plate further comprises a plurality of holes formed thereon.

13. The micro accelerometer of claim 10, wherein each set of electrode plates further comprises two sets of electrode plates interleaved with each other and parallel to the slots such that each of the slots covers portion of the electrode plates, where the two sets of electrode plates are configured in differential circuits.

14. The micro accelerometer of claim 10, wherein the proof masses are supported by a plurality of supporting anchors, where each of the supporting anchors is connected to each of the proof mass though a flexible supporter.

15. The micro accelerometer of claim 10, wherein the second proof mass and the third proof mass are arranged with a close loop control electrode respectively for controlling second proof mass and the third proof mass to move back to the original position when the second proof mass and the third proof mass generate displacement caused by an acceleration.

16. The micro accelerometer of claim 15, wherein the control electrode is rectangular electrode plate, which is arranged at the exterior side of the second proof mass and the third proof mass respectively.

17. The micro accelerometer of claim 15, wherein the control electrode comprises a electrode arranged between the two flexible supporters of the first proof mass.

18. The micro accelerometer of claim 15, wherein the control electrode comprises:
a first comb-like electrode, connected to the respective proof mass; and
a second comb-like electrode arranged to interleave with the first comb-like electrode.

19. A micro accelerometer comprising:
a first proof mass;
a second proof mass and a third proof mass arranged at each of the two opposite sides of the first proof mass, connected to the first proof mass by two flexible supporters and having a plurality of slots formed thereon, wherein the second proof mass and the third proof mass move along a first axial direction parallel to the first proof mass;
a fourth proof mass and a fifth proof mass arranged at each of the two opposite sides of the first proof mass, connected to the first proof mass by two flexible supporters and having a plurality of slots formed thereon, wherein the fourth proof mass and the fifth proof mass move along a second axial direction parallel to the first proof mass;
a plurality of electrode plate sets arranged relative to the second proof mass, the third proof mass, the fourth proof mass and the fifth proof mass respectively, for forming a plurality of sets of sensing electrodes of the first axial direction together with the second proof mass and the third proof mass and forming a plurality of sets of sensing electrodes of the second axial direction together with the fourth proof mass and the fifth proof mass, wherein the sensing electrodes are configured in differential circuits.

20. The micro accelerometer of claim 19, wherein the first proof mass comprises:
a frame;
an upper electrode plate; and
a plurality of flexible supporters connecting the frame and the upper electrode plate.

21. The micro accelerometer of claim 20, wherein the upper electrode plate further comprises a plurality of holes formed thereon.

22. The micro accelerometer of claim 19, wherein each set of electrode plates further comprises two sets of electrode plates interleaved with each other and parallel to the slots such that each of the slots covers portion of the electrode plates, where the two sets of electrode plates are configured in differential circuits.

23. The micro accelerometer of claim 19, wherein the proof masses are supported by a plurality of supporting anchors, where each of the supporting anchors is connected to each of the proof mass though a flexible supporter.

24. The micro accelerometer of claim 19, wherein the second proof mass and the third proof mass are arranged with a close loop control electrode respectively, for controlling the second proof mass and the third proof mass to move back to the original position when the second proof mass and the third proof mass generate displacement caused by an acceleration; and the fourth proof mass and the fifth proof mass are arranged with a close loop control electrode respectively, for controlling the fourth proof mass and the fifth proof mass to move back to the original position when the fourth proof mass and the fifth proof mass generate displacement caused by an acceleration.

25. The micro accelerometer of claim 24, wherein the control electrode is rectangular electrode plate, which is arranged at the exterior side of the second proof mass, the third proof mass, the fourth proof mass and the fifth proof mass respectively.

26. The micro accelerometer of claim 24, wherein the control electrode comprises a electrode arranged between the two flexible supporters of the first proof mass.

27. The micro accelerometer of claim 24, wherein the control electrode comprises:
a first comb-like electrode, connected to the respective proof mass; and
a second comb-like electrode arranged to interleave with the first comb-like electrode.

28. A micro accelerometer comprising:
- a first proof mass moving in the axial direction vertical to the first proof mass;
- a second proof mass and a third proof mass arranged at each of the two opposite sides of the first proof mass, connected to the first proof mass by two flexible supporters and having a plurality of slots formed thereon, wherein the second proof mass and the third proof mass move along a first axial direction parallel to the first proof mass;
- a fourth proof mass and a fifth proof mass arranged at each of the two opposite sides of the first proof mass, connected to the first proof mass by two flexible supporters and having a plurality of slots formed thereon, wherein the fourth proof mass and the fifth proof mass move along a second axial direction parallel to the first proof mass;
- a lower electrode arranged relative to the first proof mass for forming a sensing capacitor together with the first proof mass; and
- a plurality of electrode plate sets arranged relative to the second proof mass, the third proof mass, the fourth proof mass and the fifth proof mass respectively, for forming a plurality of sets of sensing electrodes of the first axial direction together with the second proof mass and the third proof mass and forming a plurality of sets of sensing electrodes of the second axial direction together with the fourth proof mass and the fifth proof mass, wherein the sensing electrodes are configured in differential circuits.

29. The micro accelerometer of claim 28, wherein the first proof mass comprises:
- a frame;
- an upper electrode plate; and
- a plurality of flexible supporters connecting the frame and the upper electrode plate.

30. The micro accelerometer of claim 29, wherein the upper electrode plate further comprises a plurality of holes formed thereon.

31. The micro accelerometer of claim 28, wherein each set of electrode plates further comprises two sets of electrode plates interleaved with each other and parallel to the slots such that each of the slots covers portion of the electrode plates, where the two sets of electrode plates are configured in differential circuits.

32. The micro accelerometer of claim 28, wherein the proof masses are supported by a plurality of supporting anchors, where each of the supporting anchors is connected to each of the proof mass though a flexible supporter.

33. The micro accelerometer of claim 28, wherein the second proof mass and the third proof mass are arranged with a close loop control electrode respectively, for controlling the second proof mass and the third proof mass to move back to the original position when the second proof mass and the third proof mass generate displacement caused by an acceleration; and the fourth proof mass and the fifth proof mass are arranged with a close loop control electrode respectively, for controlling the fourth proof mass and the fifth proof mass to move back to the original position when the fourth proof mass and the fifth proof mass generate displacement caused by an acceleration.

34. The micro accelerometer of claim 33, wherein the control electrode is rectangular electrode plate, which is arranged at the exterior side of the second proof mass, the third proof mass, the fourth proof mass and the fifth proof mass respectively.

35. The micro accelerometer of claim 33, wherein the control electrode comprises a electrode arranged between the two flexible supporters of the first proof mass.

36. The micro accelerometer of claim 33, wherein the control electrode comprises:
- a first comb-like electrode, connected to the respective proof mass; and
- a second comb-like electrode arranged to interleave with the first comb-like electrode.

* * * * *